US012559632B2

(12) United States Patent
Curran et al.

(10) Patent No.: US 12,559,632 B2
(45) Date of Patent: Feb. 24, 2026

(54) WEATHER-RESISTANT, FUNGAL-RESISTANT, AND STAIN-RESISTANT COATINGS AND METHODS OF APPLYING ON WOOD, MASONRY, OR OTHER POROUS MATERIALS

(71) Applicant: University of Houston System, Houston, TX (US)

(72) Inventors: Seamus Curran, Houston, TX (US); Kang-Shyang Liao, Houston, TX (US); Nigel Alley, Houston, TX (US); Amrita Haldar, Houston, TX (US); Alexander Wang, Houston, TX (US)

(73) Assignee: University of Houston System, Houston, TX (US)

( * ) Notice: Subject to any disclaimer, the term of this patent is extended or adjusted under 35 U.S.C. 154(b) by 944 days.

(21) Appl. No.: 17/729,846

(22) Filed: Apr. 26, 2022

(65) Prior Publication Data

US 2022/0259442 A1 Aug. 18, 2022

Related U.S. Application Data

(62) Division of application No. 15/526,516, filed as application No. PCT/US2015/060361 on Nov. 12, 2015, now Pat. No. 11,345,821.

(Continued)

(51) Int. Cl.
*C09D 5/00* (2006.01)
*B05D 3/00* (2006.01)

(Continued)

(52) U.S. Cl.
CPC ............... *C09D 5/00* (2013.01); *B05D 3/007* (2013.01); *C04B 41/4922* (2013.01); *C09D 5/14* (2013.01);

(Continued)

(58) Field of Classification Search
CPC .......... C09D 5/00; C09D 5/16; C09D 183/04; C04B 41/4922; C08K 5/5419; C08K 5/5435
See application file for complete search history.

(56) References Cited

U.S. PATENT DOCUMENTS 11,345,821 B2 * 5/2022 Curran .................. C09D 15/00
2011/0207852 A1 * 8/2011 Lin .................... C08G 18/6295 523/435

FOREIGN PATENT DOCUMENTS

AU 2015346315 B2 * 1/2020 ............. B05D 3/007
EP 3218438 B1 * 12/2020 ............... C09D 5/14

(Continued)

OTHER PUBLICATIONS

Office Action for Canadian Patent Application No. 2,967,755. Issued on Jan. 4, 2023.

(Continued)

*Primary Examiner* — Sophie Hon
(74) *Attorney, Agent, or Firm* — Shackelford, McKinley & Norton, LLP

(57) ABSTRACT

A process for manufacturing the composition coating may include selecting a wood or masonry material substrate and utilizing a sol-gel comprising a silane or silane derivative and metal oxide precursor to coat the substrate. The process may utilize an all solution process or controlled environment for manufacturing a composition coating that prevent wetting and/or staining of a substrate. The composition coatings for treating wood or masonry materials improves weather-resistance, microbial resistance, stain-resistance and fungal-resistance of the materials. The reduced permeability of the resulting masonry materials can also delay or inhibit degradation caused by permeation of ions such as chlorides and sulfates. In addition, a stain comprising the composite solution and pigments may impart additional property to (Continued)

wood or masonry materials whilst retaining or improving the original appearance, particularly for the visibility and contrast of the wood grain as seen after the application of the coating.

10 Claims, 3 Drawing Sheets

Related U.S. Application Data

(60) Provisional application No. 62/078,655, filed on Nov. 12, 2014, provisional application No. 62/078,582, filed on Nov. 12, 2014.

(51) Int. Cl.
*C04B 41/49* (2006.01)
*C09D 5/14* (2006.01)
*C09D 7/80* (2018.01)
*C09D 15/00* (2006.01)
*C09D 183/04* (2006.01)
*C04B 111/27* (2006.01)
*C08K 5/5419* (2006.01)
*C08K 5/5435* (2006.01)

(52) U.S. Cl.
CPC ............... *C09D 7/80* (2018.01); *C09D 15/00* (2013.01); *C09D 183/04* (2013.01); *C04B 2111/27* (2013.01); *C08K 5/5419* (2013.01); *C08K 5/5435* (2013.01)

(56) References Cited

FOREIGN PATENT DOCUMENTS

JP 6803836 B2 * 12/2020 ............... C09D 5/14
JP 6872819 B2 * 5/2021 ............... C09D 5/14

OTHER PUBLICATIONS

Office Action for Chilean Patent Application No. 2017-001203. Issued on May 23, 2022.

* cited by examiner

WEATHER-RESISTANT, FUNGAL-RESISTANT, AND STAIN-RESISTANT COATINGS AND METHODS OF APPLYING ON WOOD, MASONRY, OR OTHER POROUS MATERIALS

RELATED APPLICATIONS

This application is a divisional patent application of U.S. patent application Ser. No. 15/526,516, filed on May 12, 2017, which is a U.S. national stage application of PCT/US2015/060361, filed on Nov. 12, 2015, which claims the benefit of U.S. Provisional Patent Applications Nos. 62/078,655 filed on Nov. 12, 2014 and 62/078,582 filed on Nov. 12, 2014. The entirety of each of the aforementioned applications is incorporated herein by reference.

FIELD OF THE INVENTION

The present invention relates to composition coatings and treating wood masonry or other porous materials, for improving weather-resistance, microbial resistance, stain-resistance and fungal-resistance. The invention also relates to treating wood masonry or other porous materials with such coatings to impart water repellency, thus reducing the permeation of water soluble ions as well. The present invention also pertains to wood or masonry material coatings, e.g. paint, stain, sealant, varnish and finish, made from such compositions.

BACKGROUND OF INVENTION

In prior work entitled “Waterproof Coating with Nanoscopic/Microscopic Features and Methods of Making Same” (U.S. Non-Provisional patent application Ser. No. 14/277,325), a solution process for fabricating self-cleaning and waterproof coatings that prevent wetting or staining of a substrate was utilized. The resulting surface prevented the water from “wetting” the substrate (thus becomes “waterproof”) and protected the substrate from the consequences (e.g. stain from dyes/pigments or water damage) caused by the wetting. Beyond hydrophobicity, the ability to use such hydrophobic coating in combination with other functional additives to alleviate damage from weathering (caused by both natural-/artificial-radiation and moisture, such as the permeation of fluids and ions from ground water, sea water and soil), prevent fungal or microbial growth (caused by the fungi, microbes or other microorganisms and moisture) and subsequent degradation due to rotting, or selective rejection of staining from dyes/pigments was also discussed.

Masonry materials are widely used in the building environment ranging from the construction of walls for buildings, bridges, walkways, roads, retaining walls, monuments and other forms of wood or masonry infrastructure. However, without proper waterproofing, moisture, condensation and/or rainwater penetration can cause dampness in properties that result in mold and fungal growth (e.g. basements or highly wet or humid regions). In addition, weathering and atmospheric conditions can also cause degradation of wood or masonry infrastructure, such as from water erosion, ice or chilled water damage, or the like. The durability of wood or masonry materials may also be directly related to the permeability and penetrability, where water penetration in the form of a liquid or gas can be the catalyst or directly cause damage. In the particular case of wood structures, reducing water penetration can prevent the wood from warping, rotting or being otherwise damaged. In the particular case of steel reinforced concrete structures, reducing permeability especially in terms of fluids carrying chlorides may yield a longer lifetime for the structure. Essentially, the reduced permeability delays or inhibits chlorides reaching the underlying steel which inhibits or delays the chance of corrosion or rusting. The same case may also be made for concrete itself, as the introduction of sulfates creating expansive stresses that can cause cracking and other deterioration of the material.

In the present disclosure, improved chemical composite coatings and their use to treat or seal wood or masonry materials for improving weather-resistance, microbial resistance, stain-resistance and fungal-resistance, as cement admixtures provides improved weather-resistance and stain-resistance, and methods suitable for industrial applications are disclosed herein.

SUMMARY OF INVENTION

In one embodiment, a process for fabricating a composite coating exhibiting weather-resistant, microbial resistance, stain-resistance and fungal-resistant properties on wood, masonry, or other porous articles may include selecting a wood, masonry, or porous substrate and utilizing a sol-gel comprising at least a silane, silanol, metal oxide precursor, or a derivative thereof, to coat, bind, and/or bond to the substrate. In some embodiments, the process may optionally include coating the substrate with a hydrophobic chemical agent and/or other chemical agents to create a surface with nanoscopic or microscopic features. In some embodiments, the aforementioned coatings may be deposited in a controlled environment by misting or vapor treatment mechanism. In other embodiments, the aforementioned coating may be deposited utilizing an all solution, spraying, misting or other wet deposition processes In some embodiments, the composite coating may be provided in a composite solution to aid application, coating, deposition or the like onto a desired surface. In some embodiments, the composite coating may be related to wood, masonry, or other porous material coatings, e.g. paint, stain, sealant, varnish and finish. In some embodiments, the composite solution for treating the surface of materials may include solvent(s) to disperse all the components to form a homogeneous solution. In some embodiments, the composite may use a partial hydrophilic or hydrophobic solvent or a combination thereof, to enable delivery of the composite to the substrate which may be in itself more susceptible to water-based solvents. In some embodiments, the composite solution may include base chemical reagent(s) to form the body of the base composite. In some embodiments, the composite solution for treating the surface of materials may include chelating agent(s) to enhance homogeneity of the organic/inorganic material(s) in the solution. In some embodiments, the composite solution may include bonding agent(s) to aid bonding of the composite to a desired surface. In some embodiments, the composite solution may include plasticizer(s) to maintain elasticity of the base composite. In some embodiments, the composite solution may include viscosity modifier(s) to achieve a desired viscosity for the solution. In some embodiments, a surface treated with hydrophobic chemical agent(s) may be used to increase the surface hydrophobicity of the resulting composite. In some embodiments, a surface after treatment of hydrophobic chemical agent(s) may be used to increase the surface hydrophobicity of the resulting composite.

In some embodiments, one or more functional organic/inorganic material additives may be added into the composite solution. In some embodiments, the additive's function does not impair or only has a slight effect on the original functionality of the materials. In some embodiments, the functional additives may have properties including, but not limited to, UV absorbing/blocking, anti-reflective, anti-abrasion, fire-retardant, anti-microbial, anti-bacterial, fungal-resistant properties or pigmentation.

In some embodiments, one or more pigments, which do not impair or only have a slight effect on the original functions of the composite coating, may be added into the composite solution for wood or masonry material coatings (e.g. paint, stain, sealant, varnish and finish). In some embodiments, such pigments may include materials that change the color of reflected or transmitted light as the result of wavelength-selective absorption. Nonlimiting examples include the range of wavelengths humans can or cannot perceive, such as visible light having wavelength from approximately 390 to 700 nm; ultraviolet light having wavelengths approximately 100 to 390 nm and infrared and lower energy radiation having wavelengths from approximately 700 nm to 1 mm. In some embodiments, pigments may also include materials that protect the host composite from degradation caused by exposure to ultraviolet radiation. In some embodiments, pigments may also include materials that emit colors, such as through fluorescence, phosphorescence, and/or other forms of luminescence.

The foregoing has outlined rather broadly various features of the present disclosure in order that the detailed description that follows may be better understood. Additional features and advantages of the disclosure will be described hereinafter.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

Figure 1:
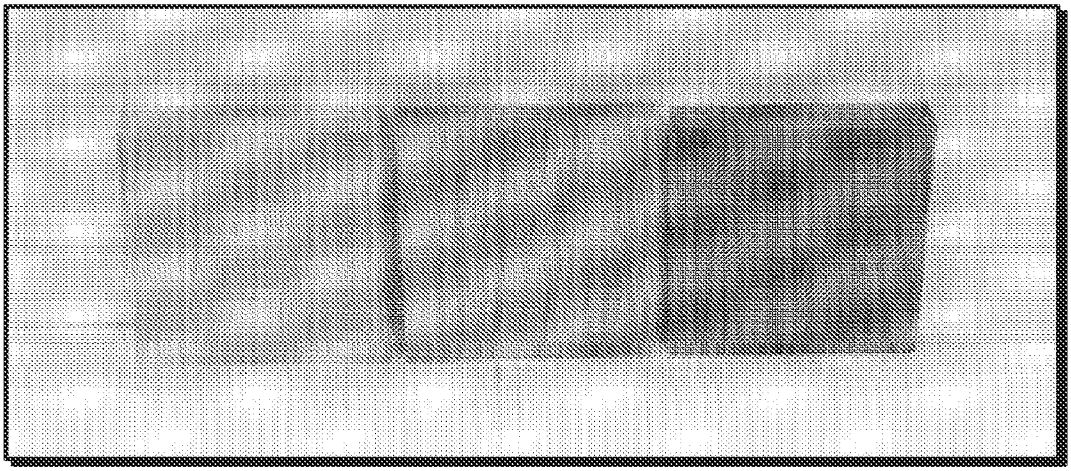
FIG. 1 shows (from left to right) untreated red oak, red oak with a clear coating and red oak coated with a pigmented coating, where the visibility and contrast of the wood grain can be clearly seen after the application of the coating.

Refer now to the drawings wherein depicted elements are not necessarily shown to scale and wherein like or similar elements are designated by the same reference numeral through the several views.

Referring to the drawings in general, it will be understood that the illustrations are for the purpose of describing particular implementations of the disclosure and are not intended to be limiting thereto. While most of the terms used herein will be recognizable to those of ordinary skill in the art, it should be understood that when not explicitly defined, terms should be interpreted as adopting a meaning presently accepted by those of ordinary skill in the art.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that comprise more than one unit unless specifically stated otherwise. Any ranges discussed herein are to be understood to include the end values defining the range, unless it is expressly stated that such end values are excluded. For example, terms such as "between X-Y", "equal to or between" X to Y or "from approximately" X to Y, where X has a lower value than Y, shall be understood to indicate that $X \leq range \leq Y$.

DEFINITIONS

The term "porous material" refers to any materials with a porous structure or voids within a volume of the material. Nonlimiting examples may include wood, masonry materials, or the like. While various embodiments discussed herein may specifically discuss wood or masonry materials, it shall be understood that such embodiments are applicable to any porous materials.

Wood contains three major chemical constituents: cellulose, hemicellulose and lignin. The term "wood" refers to the fibrous structural tissue found in the stems and roots of trees and other woody plants. The term "wood" also includes but is not limited to any material, composite or product containing or partially composed of these aforementioned fibrous structural tissues or chemical constituents.

The term "masonry materials" refers to a wide range of a materials used in man-made structures, buildings, or the like including, but not limited to, brick, stone, marble, granite, travertine, limestone, cast stone, concrete block, stucco, tile, cob and concrete, cement, mortar and grout or other cementitious materials. The term may also include, but is not limited to, any related materials to the aforementioned materials that are utilized to form hybrid or composite materials with additives or synthetic or natural fibers to increase certain properties such as strength, ductility, elasticity, viscosity, or the like.

The term "weather resistant" refers to the ability of a material to resist the effects of weathering, which are in general the degradation of materials due to cycling of hot and cold temperatures, exposure to sunlight or other forms of natural and artificial radiation and moisture.

The term "fungal resistant" refers to the ability of a material to resist the attachment, growth and spreading fungal strains. The fungal strains include but are not limited to: *Aspergillus niger*—ATCC #6275, *Penicillium citrinum*—ATCC #9849, and *Aureobasidium pullulans*—ATCC #9348 (where ATCC: American Type Culture Collection). These fungi belong to the Ascomycota Phylum. The fungi belonging to this phylum decompose cellulose (wood, paper and paperboard), textiles, paint coatings, plastics, insulation and leather, and are, therefore, employed in most of the ASTM Standard Test Methods. These fungi which produce "fuzzy" mycelial colonies on organic matter are frequently referred to as "Molds."

The term "microbial resistance" refers to the ability of a material resist the attachment, growth, and spreading microbes.

The term "stain" refers to but is not limited to coatings that are both colored (pigmented), as well as those that may impart an opaque, semi-transparent (translucent) or completely transparent coating to the wood or masonry materials.

The term "stain resistant" refers to the ability of a material to resist staining or a change in the original pigmentation, opaqueness, and appearance of the material from staining agents that have come into contact with the material. In some embodiments, stain resistant materials may not wholly prevent staining, but the stain resistant materials may hinder staining.

The term "hydrophobic" refers to a property of a material where the material impedes the wetting and/or absorption of water or water based liquids. In general, a material lacking affinity to water may be described as displaying "hydrophobicity."

The term "hydrophilic" refers to a property of a material where the material does not impede wetting and/or absorption of water or water based liquids. In general, a material with a strong affinity to water may be described as displaying "hydrophilicity."

The term "oleophobic" refers to a property of a material where the material impedes wetting and/or absorption of oil or oil based liquids is impeded.

The term "oleophilic" refers to a property of a material where the material does not impede wetting and/or absorption of oil or oil based liquids.

The term "wicking" refers to a property of a material where the material draws off water or water based liquids and/or oil or oil based liquids by capillary action. It shall be understood that in some embodiments hydrophobic and oleophobic materials discussed herein may prevent wicking.

The uses of organic/inorganic composite coatings to improve weather-resistant, microbial resistant, stain-resistant and fungal-resistant of wood, masonry, or other porous materials are discussed herein. The various embodiments of organic/inorganic materials and/or methods for manufacturing discussed herein offer new compositions and methods for making coatings from organic/inorganic materials for improved weather-resistance, microbial resistance, stain-resistance and fungal-resistance and/or other desired properties.

More specifically, embodiments discussed herein relate to compositions and methods for making organic/inorganic composite coatings for wood, masonry, or other porous materials which comprise the following steps: 1) selecting a porous substrate, and 2) utilizing a sol-gel comprising at least a silane, silanol, metal oxide precursor, or a derivative thereof, to coat the substrate and to create a surface with nanoscopic or microscopic features. In some embodiments, the method may further include optionally coating the substrate with a hydrophobic chemical agent and/or other chemical agents. In some embodiments, the above noted coatings may be deposited in a controlled environment by misting or vapor treatment. In other embodiments, the above noted coating may be deposited utilizing an all solution process.

In some embodiments, the composite coating may be provided in a composite solution to aid application, coating, deposition or the like onto a desired surface. In some embodiments, the formulation of the composite solution is selected to penetrate into a porous substrate, such as wood or masonry materials. In some embodiments, the composite solution for treating the surface of materials may include solvent(s), whether through a 'wet process,' misting mechanism or even vapor treatment method to disperse all the components to form a homogeneous entity. In some embodiments, the composite solution may include base chemical reagent(s) to form the body of the base composite. In some embodiments, the composite solution for treating the surface of materials may include chelating agent(s) to enhance homogeneity of the organic/inorganic material(s) in the solution. In some embodiments, the composite solution may include bonding agent(s) to aid bonding of the composite to a desired surface. In some embodiments, the composite solution may include plasticizer(s) to maintain elasticity of the base composite. In some embodiments, the composite solution may include viscosity modifier(s) to achieve a desired viscosity for the solution. In some embodiments, a surface treated with of hydrophobic chemical agent(s) may be used to increase the surface hydrophobicity of the resulting composite.

In some embodiments, the solvent(s) used to disperse all the components to form a homogeneous solution may include, but not limited to, water, methanol, ethanol, n-propanol, isopropanol, n-butanol, isobutanol, ethylene glycol, glycerol acetone, acetonitrile, dioxane, tetrahydrofuran, dimethylformamide, dimethyl sulfoxide or a mixture thereof.

In some embodiments, the base chemical reagent(s) to form the body of the base composite may comprise at least one alkoxysilane, metal oxide precursor or a combination thereof having a general formula of $M(OR)_4$ (M=Si, Al, Ti, In, Sn or Zr), where R comprises hydrogen, a substituted or unsubstituted alkyl or derivatives thereof. Nonlimiting examples of such chemicals includes tetramethyl orthosilicate, tetraethyl orthosilicate, tetraisopropyl orthosilicate, tetra(tert-butyl) orthosilicate, tetra(sec-butyl) orthosilicate, aluminum methoxide, aluminum ethoxide, aluminum isopropoxide, aluminum tert-butoxide, aluminum tri-sec-butoxide, titanium methoxide, titanium ethoxide, titanium isopropoxide, titanium tert-butoxide, titanium tri-sec-butoxide and derivatives bearing similar structures.

In some embodiments, the chelating agent(s) to enhance homogeneity of the organic material(s) in the solution may comprise at least one alkoxysilane, metal oxide precursor or a combination thereof having a general formula of $M(OR)_xR'_yR''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R" comprises a substituted or unsubstituted alky or alkenyl group comprising from 3 to 20 carbon atoms. Nonlimiting examples of such chemicals include trimethoxyphenylsilane, dimethoxymethylphenylsilane, methoxydimethylphenylsilane, trimethoxyphenethylsilane, dimethoxymethylphenethylsilane, methoxydimethylphenethylsilane, trimethoxyoctylsilane, dimethoxymethyloctylsilane, methoxydimethyloctylsilane, trimethoxydodecylsilane, dimethoxymethyldodecylsilane, methoxydimethyldodecylsilane, trimethoxydecylsilane, dimethoxymethyldecylsilane, methoxydimethyldecylsilane, trimethoxyoctadecylsilane, dimethoxymethyloctadecylsilane, methoxydimethyloctadecylsilane, trimethoxyhexylsilane, dimethoxymethylhexylsilane, methoxydimethylhexylsilane, trimethoxy(cyclohexylmethyl)silane, dimethoxymethyl(cyclohexylmethyl) silane, methoxydimethyl(cyclohexylmethyl)silane, triethoxyphenylsilane, diethoxymethylphenylsilane, ethoxydimethylphenylsilane, triethoxyphenethylsilane, diethoxymethylphenethylsilane, ethoxydimethylphenethylsilane, triethoxyoctylsilane, diethoxymethyloctylsilane, ethoxydimethyloctylsilane, triethoxydodecylsilane, diethoxymethyldodecylsilane, ethoxydimethyldodecylsilane, triethoxydecylsilane, diethoxymethyldecylsilane, ethoxydimethyldecylsilane, triethoxyoctadecylsilane, diethoxymethyloctadecylsilane, ethoxydimethyloctadecylsilane, triethoxyhexylsilane, diethoxymethylhexylsilane, ethoxydimethylhexylsilane, triethoxy(cyclohexylmethyl)silane, diethoxymethyl(cyclohexylmethyl)silane, ethoxydimethyl(cyclohexylmethyl)silane and derivatives bearing similar structures.

In some embodiments, the chelating agent(s) to enhance homogeneity of the inorganic material(s) in the solution may comprise at least one alkoxysilane, metal oxide precursor or a combination thereof having a general formula of $M(OR)_xR'_yR''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R" comprises a substituted or unsubstituted amine (including primary, secondary and tertiary) or thiol. Nonlimiting examples of such chemicals includes 3-aminopropyltrimethoxysilane, 3-aminopropyltriethoxysilane, 2-aminoethyltrimethoxysilane, 2-aminoethyltriethoxysilane, N-methylaminopropyltrimethoxysilane, N-methylaminopropyltriethoxysilane 4-aminobutylmethyldimethoxysilane, 4-aminobutylmethyldiethoxysilane, 3-aminopropyldimethylmethoxysilane, 3-aminopropyldimethylethoxysilane, 3-aminopropylmethyldimethoxysilane, 3-aminopropylmethyldiethoxysilane, N,N-dimethyl-3-aminopropyltrimethoxysilane, N,N-dimethyl-3-aminopropyltriethoxysilane, N,N-diethyl-3-aminopropyltrimethoxysilane, N,N-diethyl-3-aminopropyltriethoxysilane, N,N-diethylaminomethyltrimethoxysilane, N,N-diethylaminomethyltriethoxysilane, bis(2-hydroxyethyl)-3-aminopropyltrimethoxysilane, bis(2-hydroxyethyl)-3-aminopropyltriethoxysilane, N-(2'-aminoethyl)-3-aminopropyltrimethoxysilane, N-(2'-aminoethyl)-3-aminopropyltriethoxysilane, N-butyl-3-aminopropyltrimethoxysilane, N-butyl-3-aminopropyltriethoxysilane, N-octyl-3-aminopropyltrimethoxysilane, N-octyl-3-aminopropyltriethoxysilane, N-cyclohexyl-3-aminopropyltrimethoxysilane, N-cyclohexyl-3-aminopropyltriethoxysilane, N-(3'-trimethoxysilylpropyl)-piperazine, N-(3'-triethoxysilylpropyl)-piperazine, N-(3'-trimethoxysilylpropyl)morpholine, N-(3'-triethoxysilylpropyl)morpholine, bis(3-trimethoxysilylpropyl)amine, bis(3-triethoxysilylpropyl) amine, tris(3-trimethoxysilylpropyl)amine, tris(3-triethoxysilylpropyl)amine, N-methyl-N-butyl-3-aminopropyltrimethoxysilane, N-methyl-N-butyl-3-aminopropyltriethoxysilane, N-(3'-aminopropyl)-3-aminopropyltrimethoxysilane, N-(3'-aminopropyl)-3-aminopropyltriethoxysilane, N-phenyl-3-aminopropyltrimethoxysilane, N-phenyl-3-aminopropyltriethoxysilane, 3-mercaptopropyltrimethoxysilane, 3-mercaptopropyltriethoxysilane and derivatives bearing similar structures.

In some embodiments, the bonding agent(s) to aid bonding of the organic/inorganic composite to a desired surface may comprise at least one alkoxysilane, metal oxide precursor or a combination thereof having a general formula of $M(OR)_xR'_yR''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R" comprises a substituted or unsubstituted epoxy or glycidoxy. Nonlimiting examples of such chemicals includes 2-(3,4-epoxycyclohexyl)ethyltrimethoxysilane, 2-(3,4-epoxycyclohexyl)-ethyltriethoxysilane, 5,6-epoxyhexyltrimethoxysilane, 5,6-epoxyhexyltriethoxysilane, glycidoxymethyltrimethoxysilane, glycidoxymethyltriethoxysilane, 2-glycidoxyethyltrimethoxysilane, 2-glycidoxyethyltriethoxysilane, 3-glycidoxypropyltrimethoxysilane, 3-glycidoxypropyltriethoxysilane, 4-glycidoxybutyltrimethoxysilane, 4-glycidoxybutyltriethoxysilane and derivatives bearing similar structures.

In some embodiments, the plasticizer(s) to maintain elasticity of the base composite may comprise at least one alkoxysilane, metal oxide precursor or a combination thereof having a general formula of $M(OR)_{4-x}R'_x$ (M=Si, Al, In, Sn or Ti; x is the integer 1, 2 or 3), where R comprise hydrogen, a substituted or unsubstituted alkyl or derivatives thereof and R' comprise a substituted or unsubstituted alkyl, a substituted or unsubstituted alkenyl, a substituted or unsubstituted alkynyl, a substituted or unsubstituted aryl or derivatives thereof. Nonlimiting examples of such chemicals includes trimethoxymethylsilane, dimethoxydimethylsilane, methoxytrimethylsilane, trimethoxyethylsilane, dimethoxydiethylsilane, methoxytriethylsilane, trimethoxypropylsilane, dimethoxydipropylsilane, methoxytripropylsilane, trimethoxyisobutylsilane, triethoxyisobutylsilane, dimethoxydiisobutylsilane, diethoxydiisobutylsilane, trimethoxyphenylsilane, dimethoxydiphenylsilane, methoxytriphenylsilane, trimethoxyphenethylsilane, dimethoxydiphenethylsilane, methoxytriphenethylsilane, triethoxymethylsilane, diethoxydimethylsilane, ethoxytrimethylsilane, triethoxyethylsilane, diethoxydiethylsilane, ethoxytriethylsilane, triethoxypropylsilane, diethoxydipropylsilane, ethoxytripropylsilane, triethoxyphenylsilane, diethoxydiphenylsilane, ethoxytriphenylsilane, triethoxyphenethylsilane, diethoxydiphenethylsilane, ethoxytriphenethylsilane and derivatives bearing similar structures.

In some embodiments, the viscosity modifier(s) to achieve a desired viscosity for the solution may comprise at least one alkylsiloxane in oligomer/co-oligomer form, polymer/co-polymer form or a combination thereof having a general formula of

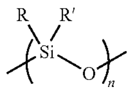

and average molecular weight equal to or between 100 to 100,000 Da, where R and R' can be the same or different and comprise hydrogen, a substituted or unsubstituted alkyl or derivatives thereof. Nonlimiting examples of such chemicals include 3-aminopropyl-terminated poly(dimethylsiloxane), chlorine-terminated poly(dimethylsiloxane), glycidyl ether-terminated poly(dimethylsiloxane), hydride-terminated poly (dimethylsiloxane), hydroxy-terminated poly(dimethylsiloxane), hydroxyalkyl-terminated poly(dimethylsiloxane), vinyl-terminated poly(dimethylsiloxane), trimethylsilyl-terminated poly(dimethylsiloxane) and derivatives bearing similar structures.

In some embodiments, one or more functional inorganic material additives may be added into the composite solution for composite coatings that do not impair or only have a slight effect the original functions of the coatings. Here the functional additives may have the properties including but not limited to, UV absorbing or blocking, anti-reflective, anti-abrasion, fire-retardant, conducting, anti-microbial, anti-bacterial, anti-fungal benefits or pigmentation. The additives may be composed of materials including but not limited to, organic/inorganic molecules/polymers having molecular weight up to about 100,000 Da, organic micro/nano materials in their natural or synthetic forms (e.g. particles, nanotubes and nanosheets) having sizes equal to or between about 2 nm to 500 μm; metal/metal oxide micro/nano materials (e.g. silver, titanium oxide, zinc oxide, aluminum oxide, iron oxide, selenium oxide, tellurium oxide and clay, which may be composed of kaolinite, montmorillonite, illite or chlorite) in their natural or synthetic forms (e.g. particles, nanotubes and nanosheets) having sizes equal to or between about 2 nm to 500 μm; and combinations thereof.

In some embodiments, one or more pigments, which do not impair or only have a slight effect on the original functions of the materials, may be added into the composite solution for making composite coatings. Such pigments may include materials that change the color of reflected or transmitted light as the result of wavelength-selective absorption. Nonlimiting examples include the range of wavelengths humans can or cannot perceive, such as visible light having wavelength from approximately 390 to 700 nm; ultraviolet light having wavelengths approximately 100 to 390 nm and infrared and lower energy radiation having wavelengths from approximately 700 nm to 1 mm. The pigments may include, but are not limited to, metal-based inorganic pigments containing metal elements such as Cadmium, Chromium, Cobalt, Copper, Iron oxide, Lead, Manganese, Mercury, Titanium Tellurium, Selenium and Zinc; other inorganic pigments such as Carbon, Clay earth and Ultramarine; organic pigments such as alizarin, alizarin crimson, gamboge, carmine, purpurin, indigo, Indian yellow, Tyrian purple, quinacridone, magenta, phthalo green, phthalo blue, diarylide yellow, pigment red, pigment yellow, pigment green, pigment blue and other inorganic or organic derivatives thereof. In some embodiments, pigments also include materials that protect the host composite from degradation caused by exposure to ultraviolet radiation, such as ultraviolet light absorbers, e.g. 2-hydroxyphenyl-benzophenones, 2-(2-hydroxyphenyl)-benzotriazole and 2-hydroxyphenyl-s-triazines derivatives; hindered-amine light stabilizers, e.g. tetramethyl piperidine derivatives and anti-oxidants, e.g. sterically hindered phenols, phosphites and thioethers. In some embodiments, pigments also include materials that emit colors, such as through fluorescence, phosphorescence, and/or other forms of luminescence. Such pigments may include but are not limited to fluorophores, such as Fluorescein, Rhodamine, Coumarin, Cyanine and their derivatives; phosphorescent dyes such as Zinc sulfide, Strontium aluminate and their derivatives.

In some embodiments, the coating formed from composite solution does not affect the original appearance of the material coated. For example, the coating does not change the pigmentation and reflectivity of the original material coated. In general it is desirable to impart some additional property to wood or masonry materials whilst retaining or improving the original appearance; this is particularly the case for the visibility and contrast of the wood or mineral grain as seen after the application of the coating. An example of such applications may be but are not limited to interior products such as in kitchens, bathrooms, furniture, hallways, interior rooms and architectural features whilst exterior or outdoor may be exemplified in fences, furniture, decking, pergolas, siding, shingles driveways, patios, flagstones, landscapes and other architectural aesthetic or structural elements. The ability to add a protective coating to such wood or masonry products is important to retain the original properties and aesthetics whilst also having the capability of tailoring the color and appearance of the wood or masonry materials to suit a particular desired natural appearance.

In some embodiments, the base composite solution is prepared by mixing at least one of the solvent(s), base chemical reagents(s), chelating agent(s), bonding agent(s), plasticizer(s), viscosity modifier(s), functional additive(s) and pigment(s) in an acidic condition (pH≤5). In some embodiments, a basic form of the composite solution may comprise at least the solvent(s), base chemical reagent(s), chelating agent(s), bonding agent(s), and plasticizer(s). In some embodiments, the composite solution may optionally include viscosity modifier(s), functional additive(s) and pigment(s). In some embodiments, the composite solution may comprise 1-10 vol. % of water, 10-40 vol. % of at least one solvent(s), 30-70 vol. % of at least one base chemical reagent(s), 10-20 vol. % of at least one plasticizer(s), 1-10 vol. % of at least one bonding agent(s), and the rest of the volume may comprise at least one of the chelating agent(s), the viscosity modifier(s), the functional additive(s) and the pigment(s). In some embodiments, the composite solution may comprise 3-8 vol. % of water, 20-30 vol. % of at least one solvent(s), 40-60 vol. % of at least one base chemical reagent(s), 10-15 vol. % of at least one plasticizer(s), 1-5 vol. % of at least one bonding agent(s), and the remaining volume may comprise any optional additives. In some embodiments, the composite solution is similar to the embodiments above, but the concentration of plasticizer(s) is less than 15 vol. %, or more preferably less than 10 vol. %. In some embodiments, the composite solution is similar to the embodiments above, but the concentration of bonding agent(s) is less than 5 vol. %, or more preferably less than 3 vol. %. The mixture of the aforementioned chemical agents may be stirred at elevated temperature equal to or between 50 to 100° C. for about ½ hour to 10 days, or preferably between 50 to 70° C. for about ½ hour to 12 hours. In some embodiments, the base composite solution is further diluted with more solvent(s) to a final concentration no less than 20 vol. % to form the final composite solution for material coatings, preferably to a final concentration between 60 to 100 vol. %, or preferably to a final concentration between 80 to 100 vol. %. As the wood or masonry materials to be coated are fairly rigid (e.g. in comparison to textiles and fabrics), a higher concentration is preferable. In some embodiments, the organic/inorganic composite solution is at least partial hydrolyzed or completely hydrolyzed.

In contrast to other conventional coating solutions for wood or masonry materials, the base composite solution discussed herein maintains the polymer components in a short chain state, which allows the base composite solution to more easily penetrate the porous wood or masonry materials. In some embodiments, the degree of polymerization of the sol-gel components is equal to or less than 100, equal to or less than 10, or equal to or less than 5. The degree of polymerization of the final sol-gel compositions can be controlled by the amount of the common linker molecular (e.g. water). As a result of the low degree of polymerization, the base composite solution can penetrate deep into the wood and masonry materials and coat at least a portion of the internal porous structure, whereas conventional coating solutions with a high degree of polymerization merely result in outer surface coatings. The wood and masonry material rely on reaction mechanisms that active silane moieties are very reactive to, such as hydroxy groups that are abundant in wood (e.g. cellulose and lignin) and masonry (e.g. silicate and metal oxides).

In some embodiments, after the substrate is treated with the sol-gel process, the resulting surface may also be optionally treated with a hydrophobic solution that comprises solvents, hydrophobic chemical agents and/or other chemical agents, which renders the surface hydrophobic/superhydrophobic and may also generates nanoscopic or microscopic topography. In some embodiments, the hydrophobic solution comprises at least one solvent and a hydrophobic chemical agent. In some embodiments, the hydrophobic solution may further include one or more other chemical agents. As a nonlimiting example of hydrophobic chemical agents used as coating in Step 3 includes at least one type of fluoroalkylsilane covalently bonded to the resulting surface, which renders the surface hydrophobic/superhydrophobic and also generates nanoscopic or microscopic topography. In some embodiments, the hydrophobic chemical agents and/or other chemical agents may be deposited utilizing a vapor treatment. In some embodiments, the hydrophobic chemical agents used may have a general formula of fluoroalkylsilane $[CF_3(CF_2)_a(CH_2)_b]_cSiR_dX_e$ (where X=Cl, Br, I or other suitable organic leaving groups, R comprise a substituted or unsubstituted alkyl, a substituted or unsubstituted alkenyl, a substituted or unsubstituted alkynyl, a substituted or unsubstituted aryl or derivatives thereof, a is the integer 0, 1, 2, 3 . . . to 20, b is the integer 0, 1, 2, 3 . . . to 10, c is the integer 1, 2, 3, d is the integer 0, 1, 2, 3 and e is the integer 1, 2, 3, provided that the sum of c, d and e equals 4). The preferred fluoroalkylsilane species may include, but are not limited to, trichloro(3,3,3-trifluoropropyl)silane, dichloro-methyl(3,3,3-trifluoropropyl)silane, chloro-dimethyl(3,3,3-trifluoropropyl)silane, trichloro (1H,1H,2H,2H-perfluorobutyl)silane, dichloro-methyl(1H, 1H,2H,2H-perfluorobutyl)silane, chloro-dimethyl(1H,1H, 2H,2H-perfluorobutyl)silane, trichloro(1H,1H,2H,2H-perfluorohexyl)silane, dichloro-methyl(1H,1H,2H,2H-perfluorohexyl)silane, chloro-dimethyl(1H,1H,2H,2H-perfluorohexyl)silane, trichloro(1H,1H,2H,2H-perfluorooctyl)silane, dichloro-methyl(1H,1H,2H,2H-perfluorooctyl)silane, chloro-dimethyl(1H,1H,2H,2H-perfluorooctyl)silane, trichloro(1H,1H,2H,2H-perfluorodecyl)silane, dichloro-methyl(1H,1H,2H,2H-perfluorodecyl) silane, chloro-dimethyl(1H,1H,2H,2H-perfluorodecyl)silane, trichloro(1H,1H,2H,2H-perfluorododecyl)silane, dichloro-methyl(1H,1H,2H,2H-perfluorododecyl) silane, chloro-dimethyl(1H,1H,2H,2H-perfluorododecyl)silane and derivatives bearing similar structures. In some embodiments, the hydrophobic chemical agent(s) may be dissolved or dispersed in one or more organic solvents. Typically, the concentration of the hydrophobic chemical agent(s) in organic solvent(s) is equal to or between 0.1 and 15 vol. %. The preferred organic solvents may include but not limited to toluene, benzene, xylene, trichloroethylene, 1,2-dichloroethane, dichloromethane, chloroform, carbon tetrachloride, tetrachloroethylene, n-propyl bromide, diethyl ether, acetone, diisopropyl ether, methyl-t-butyl ether, petroleum ethers and petroleum hydrocarbons.

Other chemical agents may also be used alone or in conjunction with fluoroalkylsilanes to perform similar tasks to render the surface hydrophobic and/or to generate nanoscopic topography. In some embodiments, other chemical agents may be hydrophobic and may have a general formula of alkylsilane $[CH_3(CH_2)_a]_bSiR_cX_d$; where X comprise Cl, Br, I or other suitable organic leaving groups, R comprise a substituted or unsubstituted alkyl, a substituted or unsubstituted alkenyl, a substituted or unsubstituted alkynyl, a substituted or unsubstituted aryl or derivatives thereof, and a is the integer 0, 1, 2, 3 . . . to 20, b is the integer 1, 2 or 3, c is the integer 0, 1, 2, 3 and d is the integer 1, 2 or 3, provided that the sum of b, c and d equals 4. The preferred alkylsilane species may include, but are not limited to, chlorosilane, dichlorosilane, trichlorosilane, chlorotrimethylsilane, dichlorodimethylsilane, trichloromethylsilane, chlorophenylsilane, dichlorophenylsilane, trichlorophenylsilane, chloromethylphenylsilane, chlorodimethylphenylsilane, dichloromethylphenylsilane, chlorodimethylphenethylsilane, dichloromethylphenethylsilane, trichlorophenethylsilane, chlorodimethyloctylsilane, dichloromethyloctylsilane trichlorooctylsilane, chlorodimethyldodecylsilane, dichloromethyldodecylsilane, trichlorododecylsilane, chlorodecyldimethylsilane, dichlorodecylmethylsilane, trichlorodecylsilane, chlorodimethyloctadecylsilane, dichloromethyloctadecylsilane, trichlorooctadecylsilane, chlorodimethylthexylsilane, dichloromethylthexylsilane, trichlorothexylsilane, allyldichloromethylsilane, allylchlorodimethylsilane, allyltrichlorosilane, (cyclohexylmethyl)chlorodimethylsilane, (cyclohexylmethyl)dichloromethylsilane, (cyclohexylmethyl) trichlorosilane and derivatives bearing similar structures. In some embodiments, the hydrophobic chemical agent(s) may be dissolved or dispersed in one or more organic solvents. Typically, the concentration of the hydrophobic chemical agent(s) in organic solvent(s) is equal to or between 0.1 and 15 vol. %. The preferred organic solvents may include but not limited to toluene, benzene, xylene, trichloroethylene, 1,2-dichloroethane, dichloromethane, chloroform, carbon tetrachloride, tetrachloroethylene, n-propyl bromide, diethyl ether, acetone, diisopropyl ether, methyl-t-butyl ether, petroleum ethers and petroleum hydrocarbons. Other chemical agents may also be used alone or in conjunction with fluoroalkylsilanes or alkylsilanes to perform similar tasks to render the surface hydrophobic and/or to generate nanoscopic topography.

In some embodiments, an example of hydrophobic chemical agents used as coating in Step 3 includes at least one type of alkoxyfluoroalkylsilane covalently bonded to the resulting surface, which renders the surface hydrophobic/superhydrophobic and also generates nanoscopic topography. The hydrophobic chemical agents used may have a general formula of alkoxyfluoroalkylsilane $[CF_3(CF_2)_a(CH_2)_b]_cSiR_d[alkoxy]_e$ (where [alkoxy] comprise methoxy, ethoxy, propoxy, isopropoxy, butoxy, isobutoxy, or a combination thereof; R comprise a substituted or unsubstituted alkyl, a substituted or unsubstituted alkenyl, a substituted or unsubstituted alkynyl, a substituted or unsubstituted aryl or derivatives thereof, a is the integer 0, 1, 2, 3 . . . to 20, b is the integer 0, 1, 2, 3 . . . to 10, c is the integer 1, 2, 3, d is the integer 0, 1, 2, 3 and e is the integer 1, 2, 3, provided that the sum of c, d and e equals 4). The preferred alkoxyfluoroalkylsilane species may include, but are not limited to, trimethoxy(3,3,3-trifluoropropyl)silane, triethoxy(3,3,3-trifluoropropyl) silane, tripropoxy(3,3,3-trifluoropropyl)silane, triisopropoxy(3,3,3-trifluoropropyl)silane, trimethoxy(1H, 1H,2H,2H-perfluorobutyl)silane, triethoxy(1H,1H,2H,2H- perfluorobutyl)silane, tripropoxy(1H,1H,2H,2H-perfluorobutyl)silane, triisopropoxy(1H,1H,2H,2H-perfluorobutyl)silane, trimethoxy(1H,1H,2H,2H-perfluorohexyl)silane, triethoxy(1H,1H,2H,2H-perfluorohexyl)silane, tripropoxy(1H,1H,2H,2H-perfluorohexyl)silane, triisopropoxy(1H,1H,2H,2H-perfluorohexyl)silane, trimethoxy(1H,1H,2H,2H-perfluorooctyl)silane, triethoxy(1H,1H,2H,2H-perfluorooctyl)silane, tripropoxy(1H,1H,2H,2H-perfluorooctyl)silane, triisopropoxy(1H,1H,2H,2H-perfluorooctyl)silane, trimethoxy(1H,1H,2H,2H-perfluorodecyl)silane, triethoxy(1H,1H,2H,2H-perfluorodecyl)silane, tripropoxy(1H,1H,2H,2H-perfluorodecyl)silane, triisopropoxy(1H,1H,2H,2H-perfluorodecyl)silane, trimethoxy(1H,1H,2H,2H-perfluorododecyl)silane, triethoxy(1H,1H,2H,2H-perfluorododecyl)silane, tripropoxy(1H,1H,2H,2H-perfluorododecyl)silane, triisopropoxy(1H,1H,2H,2H-perfluorododecyl)silane and derivatives bearing similar structures. In some embodiments, the hydrophobic chemical agent may be dissolved or dispersed in an organic solvent or a mixture of organic solvents. Typically, the concentration of the hydrophobic chemical agent(s) in organic solvent(s) is equal to or between 0.1 and 15 vol. %. The preferred organic solvents may include, but are not limited to, methanol, ethanol, n-propanol, isopropanol, n-butanol, isobutanol, acetone, acetonitrile, dioxane, tetrahydrofuran, tetrachloroethylene, n-propyl bromide, dimethylformamide, dimethyl sulfoxide and water.

In some embodiments, the alkoxyfluoroalkylsilane $[CF_3(CF_2)_a(CH_2)_b]_cSiR_d[alkoxy]_e$ is chemically converted from fluoroalkylsilane $[CF_3(CF_2)_a(CH_2)_b]_cSiR_dX_e$ by mixing and heating the fluoroalkylsilane in the correspondent solvent(s) (e.g. methanol, ethanol, isopropanol and water). The mixture of the thereof chemical agents is preferred to be stirred at elevated temperature equal to or between 50 to 100° C. for about 1 hour to 7 days in an acidic environment (pH≤1) and the solutions were neutralized with KOH (may contain up to 15% (w/w) of water) until the pH reached equal to or between 6 and 8. The hydrophobic solutions were used directly or further diluted in an appropriate solvent (e.g. methanol, ethanol, isopropanol, denatured ethanol, water, etc.).

Other chemical agents may also be used alone or in conjunction with alkoxyfluoroalkylsilanes to perform similar tasks to render the surface hydrophobic and/or to generate nanoscopic topography. In some embodiments, other chemical agents may be hydrophobic and may have a general formula of alkoxyalkylsilane $[CH_3(CH_2)_a]_bSiR_c[alkoxy]_d$; where [alkoxy] comprise methoxy, ethoxy, propoxy, isopropoxy, butoxy, isobutoxy, or a combination thereof; R comprise a substituted or unsubstituted alkyl, a substituted or unsubstituted alkenyl, a substituted or unsubstituted alkynyl, a substituted or unsubstituted aryl or derivatives thereof, and a is the integer 0, 1, 2, 3 . . . to 20, b is the integer 1, 2 or 3, c is the integer 0, 1, 2, 3 and d is the integer 1, 2 or 3, provided that the sum of b, c and d equals 4. The preferred alkoxyalkylsilane species may include, but are not limited to, trimethoxyisobutylsilane, triethoxyisobutylsilane, dimethoxydiisobutylsilane, diethoxydiisobutylsilane, trimethoxy(hexyl)silane, triethoxy(hexyl) silane, tripropoxy(hexyl)silane, triisopropoxy(hexyl)silane, trimethoxy(octyl)silane, triethoxy(octyl) silane, tripropoxy(octyl)silane, triisopropoxy(octyl)silane, trimethoxy(decyl)silane, triethoxy(decyl)silane, tripropoxy(decyl) silane, triisopropoxy(decyl)silane, trimethoxy(dodecyl)silane, triethoxy(dodecyl)silane, tripropoxy(dodecyl)silane, triisopropoxy(dodecyl)silane and derivatives bearing similar structures. In some embodiments, the hydrophobic chemical agent may be dissolved or dispersed in an organic solvent or a mixture of organic solvents. Typically, the concentration of the hydrophobic chemical agent(s) in organic solvent(s) is equal to or between 0.1 and 15 vol. %. The preferred organic solvents may include, but are not limited to, methanol, ethanol, n-propanol, isopropanol, n-butanol, isobutanol, acetone, acetonitrile, dioxane, tetrahydrofuran, tetrachloroethylene, n-propyl bromide, dimethylformamide, dimethyl sulfoxide and water. Other chemical agents may also be used alone or in conjunction with alkoxyalkylsilanes to perform similar tasks to render the surface hydrophobic and/or to generate nanoscopic topography.

In some embodiments, the alkoxyalkylsilane $[CH_3(CH_2)_a]_bSiR_c[alkoxy]_d$ is chemically converted from alkylsilane $[CH_3(CH_2)_a]_bSiR_cX_d$ by mixing and heating the fluoroalkylsilane in the correspondent solvent(s) (e.g. methanol, ethanol, isopropanol and water). The mixture of the thereof chemical agents is preferred to be stirred at elevated temperature equal to or between 50 to 100° C. for about 1 hour to 7 days in an acidic environment (pH≤1) and the solutions were neutralized with KOH (may contain up to 15% (w/w) of water) until the pH reached equal to or between 6 and 8. The hydrophobic solutions were used directly or further diluted in an appropriate solvent (e.g. methanol, ethanol, isopropanol, denatured ethanol, water, etc.).

In some embodiments, the target surface of materials may be activated before the deposition of the organic/inorganic composite solution. The surface activation may be achieved by reaction with ozone, oxygen, hydrogen peroxide, halogens, other reactive oxidizing species, or combinations thereof. The purpose is to create an energetically reactive surface, increase the concentration of free radicals and to bind molecules on the surface covalently. In some embodiments, the surface activation may be achieved by ozone plasma generated by intense UV light. In other embodiments, surface activation may be achieved by plasma treatment. In yet another embodiment, surface activation may be achieved by ozone generation using a corona discharge, flame, or plasma.

In some embodiment, as a nonlimiting example, the organic/inorganic composite solution may be deposited on the surface of wood or masonry materials by spraying, misting, doctor-blading, padding, foaming, rolling or inkjet printing. As another nonlimiting example, the materials may be dipped into the solution for a set period of time equal to or between about 1 second and 24 hour. The solvent may then be removed from the materials, and the materials may be dried or cured at a set temperature equal to or between about 25 and 200° C. In certain embodiments, the crosslink density of the crosslinkable components, e.g., the degree of crosslinking can range from 1% to 100% of complete crosslinking.

In some embodiments, as a nonlimiting example, the resulting coatings may be treated with the hydrophobic chemical agent(s) to increase the surface hydrophobicity of the resulting organic/inorganic nanocomposite. The coated materials are first placed in an enclosed environment where the hydrophobic chemical agent(s) are evaporated onto the articles by heating at the temperature equal to or between 25 and 200° C.

In some embodiment, as a nonlimiting example, the hydrophobic chemical solution may be deposited on the surface of wood or masonry materials by methods including but not limited to spraying, misting, doctor-blading, padding, foaming, rolling or inkjet printing. As another nonlimiting example, the materials may be dipped into the solution for a set period of time equal to or between about 1 second and about 24 hour. The solvent may then be removed from the materials, and the materials may be dried or cured at a set temperature equal to or between about 25 and about 200° C. In certain embodiments, the crosslink density of the crosslinkable components of the composite solution and/or hydrophobic chemical solution, e.g. the degree of crosslinking can range from 1% to 100% of complete crosslinking.

In some embodiment, the resulting treated wood or masonry materials exhibit water-resistant properties, i.e. absorb less water or moisture from the environment compared to untreated ones. In some embodiment, the resulting treated wood and masonry materials exhibit fungal-resistant properties, i.e. are more resistant to the attachment, growth and spreading of at least one the following fungal strains: *Aspergillus niger*—ATCC #6275, *Penicillium citrinum*—ATCC #9849, and *Aureobasidium pullulans*—ATCC #9348, which are the common molds, as compared to untreated wood or masonry materials. In some embodiment, the resulting treated wood and masonry materials exhibit weather-resistant property, i.e. under the same condition and duration of weathering, they absorb less water or moisture from the environment as compared to untreated wood. In some embodiment, the composite solution, when used as an admixture to the cement before or during mixing, reduces the permeability and penetrability of the resulting concrete to fluid or gas. The reduced permeability of the resulting concrete materials can also delay or inhibit degradation caused by permeation of ions such as chlorides and sulfates.

EXPERIMENTAL EXAMPLE

The following examples are included to demonstrate particular aspects of the present disclosure. It should be appreciated by those of ordinary skill in the art that the methods described in the examples that follow merely represent illustrative embodiments of the disclosure. Those of ordinary skill in the art should, in light of the present disclosure, appreciate that many changes can be made in the specific embodiments described and still obtain a like or similar result without departing from the spirit and scope of the present disclosure.

Example 1A

The following describes the solution preparation and coating procedure for treated wood sample used for fungal growth test. Sample 1: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat Ponderosa pine sapwood panels (approximately 3"×4"×¾") by soaking. The panels were fully dried before sending out for independent testing. Sample 2: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat Ponderosa pine sapwood panels (approximately 3"×4"×¾") by soaking. After the panels were fully dried, it was then treated with hydrophobic chemical agent (trimethoxy(3,3,3-trifluoropropyl)silane in methanol). The panels were fully dried before sending out for independent testing. Sample 3: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat Ponderosa pine sapwood panels (approximately 3"×4"×¾") by soaking. After the panels were fully dried, it was then treated with hydrophobic chemical agent (trimethoxy(1H,1H,2H,2H-perfluorooctyl)silane in methanol). The panels were fully dried before sending out for independent testing.

Example 2A

The following describes the procedure for fungal growth test of treated samples and the result. Sample 1, 2 and 3 were subjected to a Standard Test Method for Resistance to Mold on the Surface of Interior Coatings in an Environmental Chamber (ASTM D3273, where ASTM stands for American Society for Testing and Materials). This test method describes a small environmental chamber and the conditions of operation to evaluate reproducibly in a 4-week period the relative resistance of paint films to surface mold fungi, mildew growth in a severe interior environment. The ASTM D3273 test chamber contains soil that was seeded with fungal spores of *Aspergillus niger* ATCC #6275, *Penicillium citrinum* ATCC #9849, and *Aureobasidium pullulans* ATCC #9348 and allowed to grow. The D3273 chamber was maintained at 32.5±1° C. with a relative humidity between 95±3%. The test samples were hung in the D3273 chamber with three pieces of untreated generic wallboard to confirm validity of the fungal inculum coming from the soil. Samples were examined and rated for fungal growth and defacement weekly on a 0 to 10 rating scale by estimating the percentage of surface defacement with 10 being no defacement and 0 being completely defaced. As shown at the table below, all treated samples have the highest rating, 10, corresponding to no defacement, demonstrating resistance to fungal growth.

| Sample Description | Week 1 (Front/Back) | Week 2 (Front/Back) | Week 3 (Front/Back) | Week 4 (Front/Back) |
|---|---|---|---|---|
| Untreated wallboard | 9/10 | 5/5 | 0/0 | 0/0 |
| Sample 1 | 10/10 | 10/10 | 10/10 | 10/10 |
| Sample 2 | 10/10 | 10/10 | 10/10 | 10/10 |
| Sample 3 | 10/10 | 10/10 | 10/10 | 10/10 |

Example 3A

The following describes the solution preparation and coating procedure for treated wood samples used for weathering test. Sample 4: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat Southern Yellow Pine panels (approximately 2"×4"×½") by soaking. The panels were fully dried before sending out for independent testing. Sample 5: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat Southern Yellow Pine panels (approximately 2"×4"×½") by soaking. The panels were fully dried before sending out for independent testing. Sample 6: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 40% of the original concentration and used to treat Southern Yellow Pine panels (approximately 2"×4"× ½") by soaking. The panels were fully dried before sending out for independent testing. Sample 7: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat Southern Yellow Pine panels (approximately 2"×4"×½") by soaking. After the panels were fully dried, they were then treated with hydrophobic chemical agent (trimethoxy(1H,1H,2H,2H-perfluorooctyl)silane in methanol). The panels were fully dried before sending out for independent testing.

Example 4A

The following describes the procedure for weathering test of treated samples and the result. Each treatment consisted of a set and had 9 pieces each, with three pieces in one group. One group was removed at 360 hours exposure, another at 720 hours exposure and the last one after 1080 hours exposure. The exposure for ASTM D4587 consists of 8-hour UV at 70° C. followed by a 4-hour condensation phase at 50° C. This cycle run continuously throughout the time of exposure. The exposed samples were then subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results. The pristine samples absorbs more water when comparing the 720-hour and 1080-hour exposure to the 360-hour exposure, suggested the wood degrades substantially. The treated samples, however, generally exhibited a much lower decrease of the WRE. The slope gives the rate of change of WRE for each sample with respect to the weathering time.

| Treatment | WA-360 h | WRE-360 h | WA-720 h | WRE-720 h | WA-1080 h | WRE-1080 h | Slope (%/week) |
|---|---|---|---|---|---|---|---|
| Pristine-UV | 60% | | 66% | | 62% | | |
| Sample 4 | 36% | 39% | 41% | 39% | 42% | 32% | −1.74 |
| Sample 5 | 37% | 38% | 43% | 35% | 43% | 30% | −1.83 |
| Sample 6 | 41% | 32% | 45% | 33% | 44% | 29% | −0.65 |
| Sample 7 | 42% | 31% | 44% | 34% | 45% | 27% | −0.97 |

Example 5A

The following describes the of solution preparation and coating procedure in order to compare the water repellent efficiency between original composite solution (as clear wood sealant) and composite solution mixed with pigments (as wood stain). Sample 8: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat Ponderosa Pine panels (approximately 5"×3"×¾") by submerging the sample into the solution. The panels were fully dried before test. Sample 9: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was mixed with a combination of commercially available pigments to form a wood stain. The stain was used to treat Ponderosa Pine panels (approximately 5"×3"×¾") by applying the stain on the panel with a foam brush. The panels were fully dried before test.

Example 6A

The following describes the procedure for water repellent test for treated samples and the result. Both samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results. The wood stain exhibited a similar WRE comparing the clear sealant, suggested that the pigmentation does not impair the performance of water repellency of the original formula. This demonstrates the ability to add a protective coating to such wood products is important to retain the original properties and aesthetics whilst also having the capability of tailoring the color and appearance of the wood to suit a particular desired natural appearance. Both the samples were exposed to continuous UVB-340 exposure in a chamber maintained at 50° C. (dry environment) for 4 weeks. After 4 weeks, both samples were taken out of the chamber, allowed to condition at room temperature for at least 24 hours. Then, the samples were again subjected to a moisture test based on ASTM D1037. Water absorption (WA) and water repellent efficiency (WRE) of the coatings was calculated after the a 2-plus-22-h submersion. The samples show no sign of degradation after 4 weeks of continuous UVB-340 exposure at 50° C. (dry environment). FIG. 1 shows pictures comparing the original red oak, red oak coated with the clear sealant and red oak coated with the stain. The visibility and contrast of the wood grain can be clearly seen after the application of the coating.

| | Before UVB exposure | | After UVB exposure | |
|---|---|---|---|---|
| Treatment | WA | WRE | WA | WRE |
| Sample 8 | 24% | 46% | 25% | 45% |
| Sample 9 | 24% | 48% | 27% | 41% |

Figure 2:
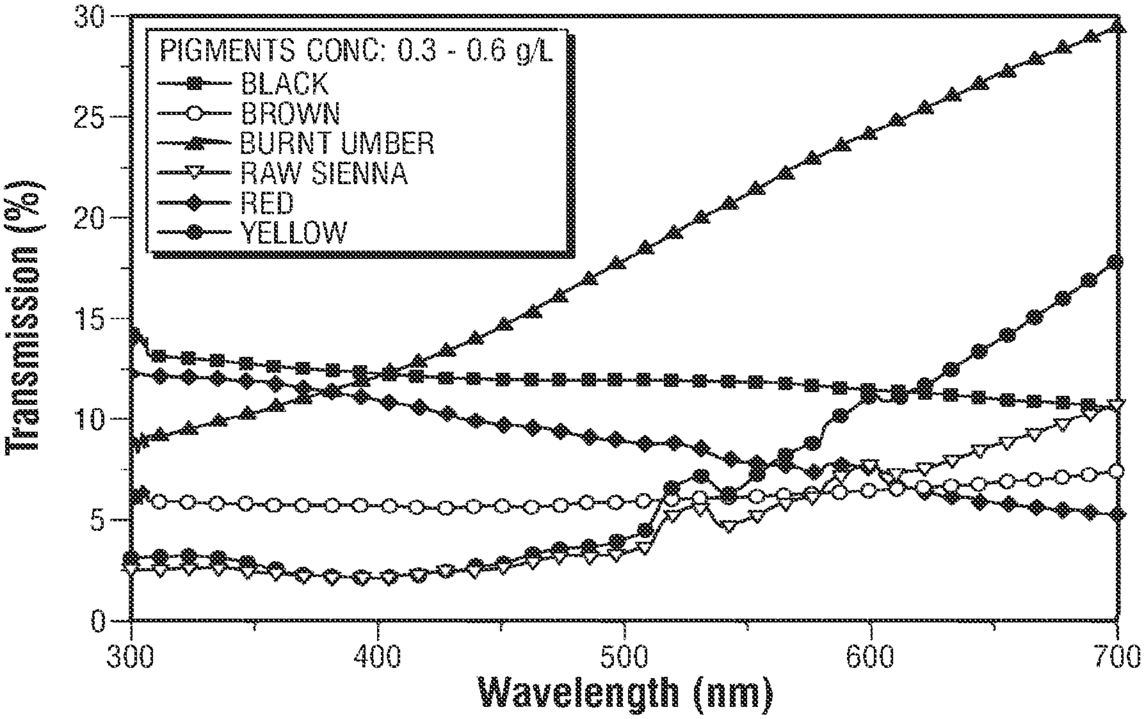
FIG. 2 shows UV-vis spectra of wood stains comprising of sol-gel components mixed with six distinctive earth color tones pigments, respectively.

The pigments in the sol-gel composite are not only used for retaining or improving the original aesthetic appearance but also for protecting host composite against the degradation caused by exposure to harmful radiation. As shown in FIG. 2, the wood stain comprising of a mixture of the sol-gel components with various pigments displayed a wide range of color tone. In addition, the pigments displayed a broad light attenuation from UVB/UVA to visible range. To obtain spectra with distinguishable transmission, the original wood stains were diluted between 30 to 100 times. Therefore, the original wood stains should block at least 99% of the UV-visible light and provide extra protecting to the wood materials underneath.

Example 7A

The following describes the solution preparation and coating procedure to produce treated cedar samples used for comparing the water repellent efficiency between composite solution with methanol as solvent and composite solution with ethanol as solvent. Sample 10: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat cedar panels (approximately 6"×6"×1") by submerging the sample into the solution. The panels were fully dried before test. Sample 11: A sol-gel solution comprised a mixture of base chemical reagent (tetraethyl orthosilicate), plasticizer (trimethoxypropylsilane), bonding agent (3-glycidoxypropyltrimethoxysilane) and solvents (water and ethanol) in an acidic condition (pH=5, adjusted with HCl) was prepared by mixing the above chemicals. The resulting solution was diluted with ethanol to 60% of the original concentration and used to treat cedar panels (approximately 6"×6"×1") by submerging the sample into the solution. The panels were fully dried before test.

Example 8A

The following describes the procedure for water repellent test for treated cedar samples and the result. Both samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results. Both treated samples exhibited a similar WRE, suggesting that the different solvents used in the composite solution formula does not impair the performance of water repellency.

| Treatment | WA | WRE |
|---|---|---|
| Pristine | 30% | |
| Sample 10 | 20% | 33% |
| Sample 11 | 22% | 28% |

Example 9A

The following describes the solution preparation and coating procedure to produce treated whitewood samples used for comparing the water repellent efficiency between composite solution with methanol as solvent and composite solution with ethanol as solvent. Sample 12: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat whitewood panels (approximately 6"×6"×1") by submerging the sample into the solution. The panels were fully dried before test. Sample 13: A sol-gel solution comprised a mixture of base chemical reagent (tetraethyl orthosilicate), plasticizer (trimethoxypropylsilane), bonding agent (3-glycidoxypropyltrimethoxysilane) and solvents (water and ethanol) in an acidic condition (pH=5, adjusted with HCl) was prepared by mixing the above chemicals. The resulting solution was diluted with ethanol to 60% of the original concentration and used to treat whitewood panels (approximately 6"×6"×1") by submerging the sample into the solution. The panels were fully dried before test.

Example 10A

The following describes the procedure for water repellent test for treated whitewood samples and the result. Both samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results. Both treated samples exhibited a similar WRE, suggesting that the different solvents used in the composite solution formula does not impair the performance of water repellency.

| Treatment | WA | WRE |
|---|---|---|
| Pristine | 32% | |
| Sample 12 | 18% | 43% |
| Sample 13 | 17% | 48% |

Example 11A

The following describes the solution preparation and coating procedure to produce treated radiata pine samples used for comparing the water repellent efficiency between composite solution with methanol as solvent and composite solution with ethanol as solvent. Sample 14: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat radiata pine panels (approximately 6"×6"×1") by submerging the sample into the solution. The panels were fully dried before test. Sample 15: A sol-gel solution comprised a mixture of base chemical reagent (tetraethyl orthosilicate), plasticizer (trimethoxypropylsilane), bonding agent (3-glycidoxypropyltrimethoxysilane) and solvents (water and ethanol) in an acidic condition (pH=5, adjusted with HCl) was prepared by mixing the above chemicals. The resulting solution was diluted with ethanol to 60% of the original concentration and used to treat radiata pine panels (approximately 6"×6"×1") by submerging the sample into the solution. The panels were fully dried before test.

Example 12A

The following describes the procedure for water repellent test for treated radiata pine samples and the result. Both samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results. The sample 15 shows only a small reduced WRE compared to sample 14.

| Treatment | WA | WRE |
|---|---|---|
| Pristine | 25% | |
| Sample 14 | 20% | 21% |
| Sample 15 | 22% | 15% |

Example 13A

The following describes the solution preparation and coating procedure to produce treated cedar samples used for comparing the water repellent efficiency between the composite solutions and leading commercial brands. Sample 16: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat cedar panel (approximately 6"×6"×1"). The solution was applied to the panel using a foam roller. After drying for an hour at room temperature, a second coat was applied. The panel was fully dried before test. Sample 17: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat cedar panel (approximately 6"×6"×1"). The solution was applied to the panel using a foam roller. After drying for an hour at room temperature, a second coat was applied. After the panel was fully dried, it was then coated with a hydrophobic chemical agent (trimethoxy(3,3,3-trifluoropropyl)silane in methanol) using a foam roller. The panel was fully dried before test. Sample 18: A commercial transparent waterproofing acrylic wood finish was applied to cedar panel (approximately 6"×6"×1") according to instructions provided. Sample 19: A commercial transparent weatherproofing all-in-one acrylic wood finish was applied to cedar panel (approximately 6"×6"×1") according to instructions provided. Sample 20: A commercial waterproofing petroleum solvent based wood protector was applied to cedar panel (approximately 6"×6"×1") according to instructions provided. Sample 21: A commercial clear multi-surface petroleum solvent based water-proofer was applied to cedar panel (approximately 6"×6"×1") according to instructions provided. Sample 22: A commercial multi-purpose super hydrophobic coating system was applied to cedar panel (approximately 6"×6"×1") according to instructions provided.

Example 14A

The following describes the procedure for water repellent test for treated cedar samples and the result. All the samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results.

| Treatment | WA | WRE |
|---|---|---|
| Pristine | 38% | |
| Sample 16 | 13% | 66% |
| Sample 17 | 11% | 72% |
| Sample 18 | 14% | 61% |
| Sample 19 | 28% | 25% |
| Sample 20 | 13% | 66% |
| Sample 21 | 66% | −75% |
| Sample 22 | 9% | 75% |

Example 15A

The following describes the solution preparation and coating procedure to produce treated whitewood samples used for comparing the water repellent efficiency between composite solutions and leading commercial brands. Sample 23: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat whitewood panel (approximately 6"×6"×1"). The solution was applied to the panel using a foam roller. After drying for an hour at room temperature, a second coat was applied. The panel was fully dried before test. Sample 24: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat whitewood panel (approximately 6"×6"×1"). The solution was applied to the panel using a foam roller. After drying for an hour at room temperature, a second coat was applied. After the panel was fully dried, it was then coated with a hydrophobic chemical agent (trimethoxy(3,3,3-trifluoropropyl)silane in methanol) using a foam roller. The panel was fully dried at room temperature before test. Sample 25: A commercial transparent waterproofing acrylic wood finish was applied to whitewood panel (approximately 6"×6"×1") according to instructions provided. Sample 26: A commercial transparent weatherproofing all-in-one acrylic wood finish was applied to whitewood panel (approximately 6"×6"×1") according to instructions provided. Sample 27: A commercial waterproofing petroleum solvent based wood protector was applied to whitewood panel (approximately 6"×6"×1") according to instructions provided. Sample 28: A commercial clear multi-surface petroleum solvent based water-proofer was applied to whitewood panel (approximately 6"×6"×1") according to instructions provided. Sample 29: A commercial multi-purpose super hydrophobic coating system was applied to whitewood panel (approximately 6"×6"×1") according to instructions provided.

Example 16A

The following describes the procedure for water repellent test for treated whitewood samples and the result. All the samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results.

| Treatment | WA | WRE |
|---|---|---|
| Pristine | 30% | |
| Sample 23 | 12% | 59% |
| Sample 24 | 10% | 68% |
| Sample 25 | 13% | 57% |
| Sample 26 | 19% | 35% |
| Sample 27 | 14% | 54% |
| Sample 28 | 27% | 8% |
| Sample 29 | 24% | 20% |

Example 17A

The following describes the solution preparation and coating procedure to produce treated radiata pine samples used for comparing the water repellent efficiency between composite solutions and leading commercial brands. Sample 30: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat radiata pine panel (approximately 6"×6"×1"). The solution was applied to the panel using a foam roller. After an hour at room temperature, a second coat was applied. The panel was fully dried before test. Sample 31: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was diluted with methanol to 60% of the original concentration and used to treat radiata pine panel (approximately 6"×6"×1"). The solution was applied to the panel using a foam roller. After drying for an hour at room temperature, a second coat was applied. After the panel was fully dried, it was then coated with a hydrophobic chemical agent (trimethoxy(3,3,3-trifluoropropyl)silane in methanol) using a foam roller. The panel was fully dried before test. Sample 32: A commercial transparent waterproofing acrylic wood finish was applied to radiata pine panel (approximately 6"×6"×1") according to instructions provided. Sample 33: A commercial transparent weatherproofing all-in-one acrylic wood finish was applied to radiata pine panel (approximately 6"×6"×1") according to instructions provided. Sample 34: A commercial waterproofing petroleum solvent based wood protector was applied to radiata pine panel (approximately 6"×6"×1") according to instructions provided. Sample 35: A commercial clear multi-surface petroleum solvent based water-proofer was applied to radiata pine panel (approximately 6"×6"×1") according to instructions provided. Sample 36: A commercial multi-purpose super hydrophobic coating system was applied to radiata pine panel (approximately 6"×6"×1") according to instructions provided.

Example 18A

The following describes the procedure for water repellent test for treated radiata pine samples and the result. All the samples were subjected to a moisture test based on ASTM D1037: Standard Test Methods for Evaluating Properties of Wood-Base Fiber and Particle Panel Materials (Moisture test: Water Absorption and Thickness Swelling). The specimens was submerged horizontally under 1 in. (25 mm) of potable water maintained at a temperature of 68±2° F. (20±1° C.). After a 2-h submersion, the specimen is suspended to drain for 10±2 min, then the excess surface water was removed and the specimen weighed immediately. The specimen was submerged for an additional period of 22 h and the above weighing procedure repeated. Method A, with its initial 2-h submersion period, provides information on the short term (2 h) and longer term (2-plus-22-h) water absorption performance. The water absorption (WA) is expressed as a percent for the specimen after a 2-plus-22-h submersion. Water repellent efficiency (WRE) of the coatings was calculated using the procedure detailed in ASTM D5401: Standard Test Method for Evaluating Clear Water Repellent Coatings on Wood. The results shown at the table below are the longer term (2-plus-22-h) results.

| Treatment | WA | WRE |
|---|---|---|
| Pristine | 38% | |
| Sample 30 | 20% | 48% |
| Sample 31 | 9% | 75% |
| Sample 32 | 10% | 73% |
| Sample 33 | 14% | 63% |
| Sample 34 | 12% | 68% |
| Sample 35 | 26% | 30% |
| Sample 36 | 12% | 68% |

The following describes experimental examples for masonry materials.

Procedure for bulk water sorption test of dried concrete (ASTM C1757): This test method determines the water absorbed into dried concrete in the first 30 minutes as an indicator of the susceptibility of the concrete to water intrusion. This test method subjects all of the surfaces of the specimen to water thereby giving a value for bulk sorption of the specimen that gives an indication of the potential durability of the concrete mixture. A concrete specimen is dried at 50° C. to constant mass, and then conditioned for one day. After immersion in water for 30 minutes, the specimen's gain in mass is measured and the sorption (in millimeters) is calculated. The sorption of the specimen is calculated as the change in mass divided by the product of the surface area of the test specimen and the density of water. This test method is intended to compare the relative performance of concrete mixtures exposed to wetting and drying. It is not intended to compare the performance of concrete mixtures that will be submerged continuously.

The following describes the procedure for measurement of absorption and void in harden concrete (ASTM C642): This test method is used to determine the percent absorption of water in hardened concrete. A specimen is first dried in in an oven at a temperature of 110±5° C. for no less than 24 hours. After removing the specimen from the oven, it is allowed to cool in dry air to a temperature of 20 to 25° C. The oven-dried mass is then determined. The specimen is then immersed in water at approximately 21° C. for no less than 48 hours and until two successive values of mass of the surface-dried sample at intervals of 24 hours showed an increase in mass of less than 0.5% of the larger value. The specimen is surface-dried by removing surface moisture with a towel, and the saturated mass after immersion is determined. Using the two masses, the percent absorption after immersion is calculated as detailed in the procedure.

The following describes the procedure for measurement of rate of absorption of water by hydraulic-cement concretes (ASTM C1585): This test method is used to determine the rate of absorption (sorptivity) of water by hydraulic cement concrete by measuring the increase in the mass of a specimen resulting from absorption of water as a function of time when only one surface of the specimen is exposed to water at room temperature while the other surfaces are sealed (simulating water absorption in a manner that is in contact with water on one side only). The specimen is conditioned in an environment at a standard relative humidity to induce a consistent moisture condition in the capillary pore system. The exposed surface of the specimen is immersed in water and water ingress of unsaturated concrete is dominated by capillary suction during initial contact with water. The performance of concrete subjected to many aggressive environments is a function, to a large extent, of the penetrability of the pore system. In unsaturated concrete, the rate of ingress of water or other liquids is largely controlled by absorption due to capillary rise. After the specimen is conditioned according to the standard procedure, the side surface of each specimen is sealed with aluminum tape. The specimen is place on top of a support device at the bottom of a pan and the pan filled with tap water so that the water level is 1 to 3 mm above the top of the support device. The mass is recorded at given intervals. The absorption (I), initial and secondary rate of water absorption is calculated as detailed in the procedure. The initial rate of water absorption ($mm/s^{1/2}$) is defined as the slope of the line that is the best fit to I plotted against the square root of time ($s^{1/2}$). The secondary rate of water absorption ($mm/s^{1/2}$) is defined as the slope of the line that is the best fit to I plotted against the square root of time ($s^{1/2}$) using all the points after 1 day. The slopes are obtained by using least squares, linear regression analysis of the plot of I versus $time^{1/2}$.

The following describes the procedure to determine stain resistance for pile floor coverings (AATCC Test Method 175-2003): The purpose of this test method is to determine the stain-resistance of a carbonate-based tile material by an acidic dye. The test method can also be used to determine the efficacy of a carbonate-based tile material that has been treated with an anti-staining agent. The test method is conducted by applying 2.0 mL of a diluted aqueous solution of allura red (FD&C Red 40) into the center of a staining ring placed atop a flat test specimen. Rather than using the prescribed aqueous allura red solution, red (fruit punch) Gatorade is used as an acceptable substitute staining agent. The wetted test specimen is left unperturbed for 24±4.0 hours. To remove the stain, the test specimen is rinsed under running water while rubbing the stain site until the rinsing water is devoid of staining agent. Prior to evaluation, the test specimen is oven dried at 100±5° C. for 90 minutes. The resulting stained test specimen is evaluated in accordance with the AATCC Red 40 Stain Scale. Each test specimen may receive an AATCC Red 40 Stain Scale grade of 1.0–10 (1.0=severely stained and 10=no staining).

Example 1B: The following describes the solution preparation and coating procedure for treated concrete block samples used for bulk water sorption test of dried concrete (ASTM C1757) & measurement of absorption and void in harden concrete (ASTM C642). Sample 1: A pristine concrete block (approximately 19.3 cm×9.2 cm×5.8 cm) without any treatment. Sample 2: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat the pristine concrete block by soaking. The block was fully dried/cured before testing. Sample 3: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat the pristine concrete block by soaking. After the block was fully dried/cured, it was then coated with a hydrophobic chemical agent (comprised of a trimethoxy(1H, 1H,2H,2H-perfluorooctyl)silane in methanol) using a foam roller. The panel was fully dried/cured at room temperature before testing. Sample 4: A commercial clear multi-surface petroleum solvent based water-proofer was applied to a pristine concrete block according to instructions provided.

The following describes the procedure for water absorption test of treated samples and the result. All the samples were subjected to ASTM C1757. The samples were dried at 50° C. to constant mass, and then conditioned for one day. The samples were then immersed in water for 30 minutes, the specimen's gain in mass is measured and the sorption (in millimeters) is calculated. The sorption of the specimen is calculated as the change in mass divided by the product of the surface area of the test specimen and the density of water. The percent absorption of water in the samples also determined using ASTM C642. The samples were first dried in in an oven at a temperature of 50±5° C. for 96 hours. After removing the samples from the oven, they were allowed to cool in dry air to a temperature of 20 to 25° C. The oven-dried mass was then determined. The samples were then immersed in water at approximately 21° C. for no less than 48 hours and until two successive values of mass of the surface-dried sample at intervals of 24 hours showed an increase in mass of less than 0.5% of the larger value. The specimen was surface-dried by removing surface moisture with a towel, and the saturated mass after immersion was determined. Using the two masses, the percent absorption (WA %) after immersion is calculated as detailed in the ASTM C642 procedure. The results are shown in the table below.

| | I (mm) (0.5 h) | WA % (0.5 h) | WA % (24 h) | WA % ) (48 h |
|---|---|---|---|---|
| Sample #1 | 1.129 | 3.66 | 4.03 | 4.20 |
| Sample #2 | 0.080 | 0.26 | 2.15 | 2.76 |
| Sample #3 | 0.047 | 0.15 | 1.45 | 1.99 |
| Sample #4 | 0.231 | 0.73 | 2.51 | 2.63 |

Example 2B: The following describes the solution preparation and coating procedure for treated kiln-fired brick samples used for bulk water sorption test of dried concrete (ASTM C1757) & measurement of absorption and void in harden concrete (ASTM C642). Sample 5: A pristine kiln-fired brick (approximately 19.8 cm×9.9 cm×4.5 cm) without any treatment. Sample 6: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat the pristine kiln-fired brick by soaking. The brick was fully dried/cured before testing. Sample 7: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat the pristine kiln-fired brick by soaking. After the brick was fully dried/cured, it was then coated with a hydrophobic chemical agent (comprised of a trimethoxy(1H, 1H,2H,2H-perfluorooctyl)silane in methanol) using a foam roller. The panel was fully dried/cured at room temperature before test. Sample 8: A commercial clear multi-surface petroleum solvent based water-proofer was applied to a pristine kiln-fired brick according to instructions provided.

The following describes the procedure for water absorption test of treated samples and the result. All the samples were subjected to ASTM C1757. The samples were dried at 50° C. to constant mass, and then conditioned for one day. The samples were then immersed in water for 30 minutes, the specimen's gain in mass is measured and the sorption (in millimeters) is calculated. The sorption of the specimen is calculated as the change in mass divided by the product of the surface area of the test specimen and the density of water. The percent absorption of water in the samples also determined using ASTM C642. The samples were first dried in in an oven at a temperature of 50±5° C. for 96 hours. After removing the samples from the oven, they were allowed to cool in dry air to a temperature of 20 to 25° C. The oven-dried mass was then determined. The samples were then immersed in water at approximately 21° C. for no less than 48 hours and until two successive values of mass of the surface-dried sample at intervals of 24 hours showed an increase in mass of less than 0.5% of the larger value. The specimen was surface-dried by removing surface moisture with a towel, and the saturated mass after immersion was determined. Using the two masses, the percent absorption (WA %) after immersion is calculated as detailed in the ASTM C642 procedure. The results are shown in the table below.

| | I (mm) (0.5 h) | WA % (0.5 h) | WA % (24 h) | WA % (48 h) |
|---|---|---|---|---|
| Sample #5 | 0.313 | 1.05 | 2.99 | 3.24 |
| Sample #6 | 0.027 | 0.10 | 0.78 | 1.34 |
| Sample #7 | 0.023 | 0.08 | 1.19 | 1.85 |
| Sample #8 | 0.123 | 0.43 | 2.50 | 2.96 |

Example 3B: The following describes the solution preparation and coating procedure for treated grout samples used for measurement of rate of absorption of water by hydraulic cement concretes (ASTM C1585). Sample 9: A commercial sanded grout was applied to a set of ceramic tiles (approximately 14.5 cm×14.5 cm) and dried/cured according to instructions provided. The exposed surface area of the grout is approximately 33.5 $cm^2$. Sample 10: A commercial sanded grout was applied to a set of ceramic tiles and dried/cured according to instructions provided. The surface area of the grout is approximately 33.5 $cm^2$. A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat the grout area with a foam brush. The brick was fully dried/cured before testing. Sample 11: A commercial sanded grout was applied to a set of ceramic tiles and dried/cured according to instructions provided. The surface area of the grout is approximately 33.5 $cm^2$. A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was mixed with commercial pigment(s) and used to treat the grout area with a foam brush. The brick was fully dried/cured before testing.

Figure 3:
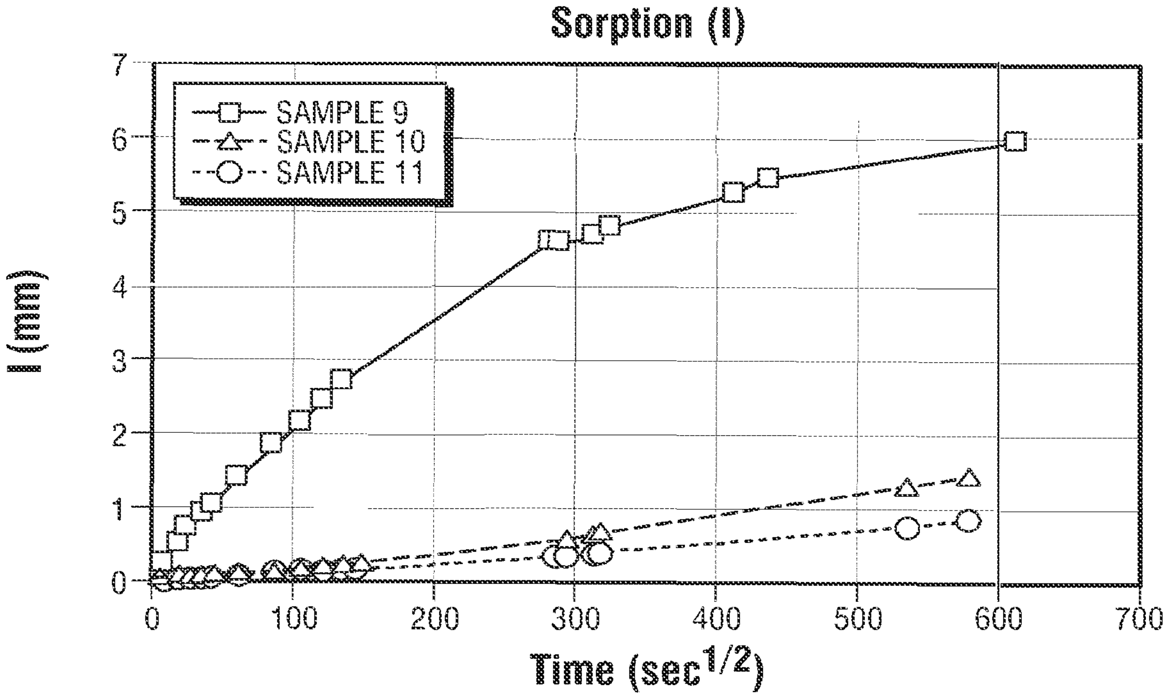
FIG. 3 show a plot of sorption, I (mm), against the square root of time ($s^{1/2}$) for three samples.

The following describes the procedure to determine the rate of absorption (sorptivity) of water of treated samples and the result. All the samples were subjected to ASTM C1585. The samples were dried at 50° C. to constant mass, and then conditioned for one day. The side surface of each sample was sealed with aluminum tape, such that, only one surface of the specimen is exposed to water at room temperature (simulating water absorption in a manner that is in contact with water on one side only). The sample was place on top of a support device at the bottom of a pan and the pan filled with tap water so that the water level is 1 to 3 mm above the top of the support device. The mass was recorded at given intervals. The absorption (I), initial and secondary rate of water absorption was calculated as detailed in the procedure. The initial rate of water absorption $S_i$ (mm/$s^{1/2}$) is defined as the slope of the line that is the best fit to I plotted against the square root of time ($s^{1/2}$), use all the points from 1 minute to 6 hours. The secondary rate of water absorption $S_s$ (mm/$s^{1/2}$) is defined as the slope of the line that is the best fit to I plotted against the square root of time ($s^{1/2}$) using all the points after 1 day. The slopes are obtained by using least squares, linear regression analysis of the plot of I versus time$^{1/2}$. The results are shown at the table below. FIG. 3 showed the plot of sorption, I (mm), against the square root of time ($s^{1/2}$) for the three grout samples. The decrease in sorption after the application of the coating is seen clearly.

| | $S_i$ (mm/√s) | $S_s$ (mm/√s) |
|---|---|---|
| Sample #9 | $1.88 \times 10^{-2}$ | $4.22 \times 10^{-3}$ |
| Sample #10 | $1.62 \times 10^{-3}$ | $2.98 \times 10^{-3}$ |
| Sample #11 | $1.37 \times 10^{-3}$ | $1.65 \times 10^{-3}$ |

Example 4B: The following describes the solution preparation and usage as an admixture to the cement immediately before mixing to produce cement concrete materials and the test for measurement of rate of absorption of water of such materials (ASTM C1585). Sample 12: A commercial cement-based grout was mixed with water according to instructions provided and poured into a plastic mold (using a petri dish with 150 mm dia.×15 mm h.) to set. After the cement sample was dried/cured at room temperature for at least 10 days, the sample was removed from the mold and polished with sander to remove the outer uneven area before testing. Sample 13: A commercial cement-based grout was mixed with a commercial stain resistant grout additive (to replace water) according to instructions provided and poured into a plastic mold (using a petri dish with 150 mm dia.×15 mm h.) to set. After the cement sample was dried/cured at room temperature for at least 10 days, the sample was removed from the mold and polished with sander to remove the outer uneven area before testing. Sol-gel solution preparation: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The solution was used as an admixture with water in various ratios before mixing with the cement-based grout. Sample 14: A commercial cement-based grout was mixed with a solution comprising of water and sol-gel solution according to instructions provided and poured into a plastic mold (using a petri dish with 150 mm dia.×15 mm h.) to set. After the cement sample was dried/cured at room temperature for at least 10 days, the sample was removed from the mold and polished with sander to remove the outer uneven area before testing.

Figure 4:
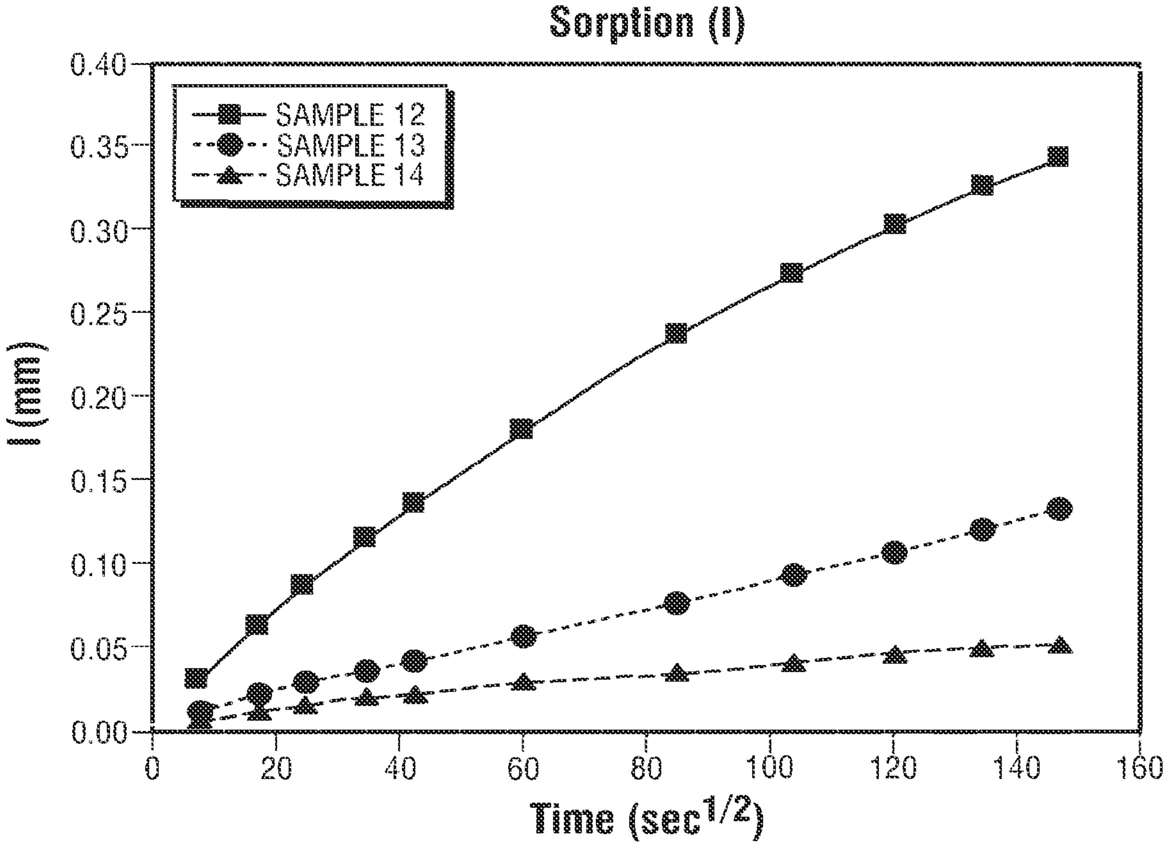
FIG. 4 shows a plot of sorption, I (mm), against the square root of time ($s^{1/2}$) for four cement samples.

The following describes the procedure to determine the rate of absorption (sorptivity) of water of treated samples and the result. All the samples were subjected to ASTM C1585. The samples are dried at 50° C. to constant mass, and then conditioned for one day. The side surface of each sample was sealed with aluminum tape, such that, only one surface of the specimen is exposed to water at room temperature (simulating water absorption in a manner that is in contact with water on one side only). The sample was place on top of a support device at the bottom of a pan and the pan filled with tap water so that the water level is 1 to 3 mm above the top of the support device. The mass was recorded at given intervals. The absorption (I), initial and secondary rate of water absorption was calculated as detailed in the procedure. The initial rate of water absorption (mm/$s^{1/2}$) is defined as the slope of the line that is the best fit to I plotted against the square root of time ($s^{1/2}$), use all the points from 1 minute to 6 hours. The slopes are obtained by using least squares, linear regression analysis of the plot of I versus $time^{1/2}$. The percent absorption (WA %) was determined as detailed in ASTM C642. The results were shown at the table below. FIG. 4 shows the plot of sorption, I (mm), against the square root of time ($s^{1/2}$) for the four cement samples. The decrease in sorption of Sample 14 is clearly greater than other samples (including the commercial brand: Sample 13).

| | WA % (6 h) | $I$ (mm) (6 h) | $S_i$ (mm/√s) |
|---|---|---|---|
| Sample #12 | 7.28 | 0.345 | $1.88 \times 10^{-2}$ |
| Sample #13 | 2.69 | 0.134 | $1.62 \times 10^{-3}$ |
| Sample #14 | 1.15 | 0.052 | $1.62 \times 10^{-3}$ |

Example 5B: The following describes the solution preparation and coating procedure for treated travertine (limestone) tile samples used to determine stain resistance for floor coatings (AATCC Test Method 175-2003). Sample 15: Three pristine travertine tiles (approximately 10 cm×10 cm×1 cm) without any treatment. Sample 16: A sol-gel solution comprised a mixture of base chemical reagent (tetraethyl orthosilicate), plasticizer (trimethoxypropylsilane), bonding agent (3-glycidoxypropyltrimethoxysilane) and solvents (water and methanol) in an acidic condition (pH=5, adjusted with HCl) was prepared by mixing the above chemicals. The resulting solution was used to treat four pristine travertine tiles by soaking. The tiles were fully dried/cured before testing.

Figure 5:
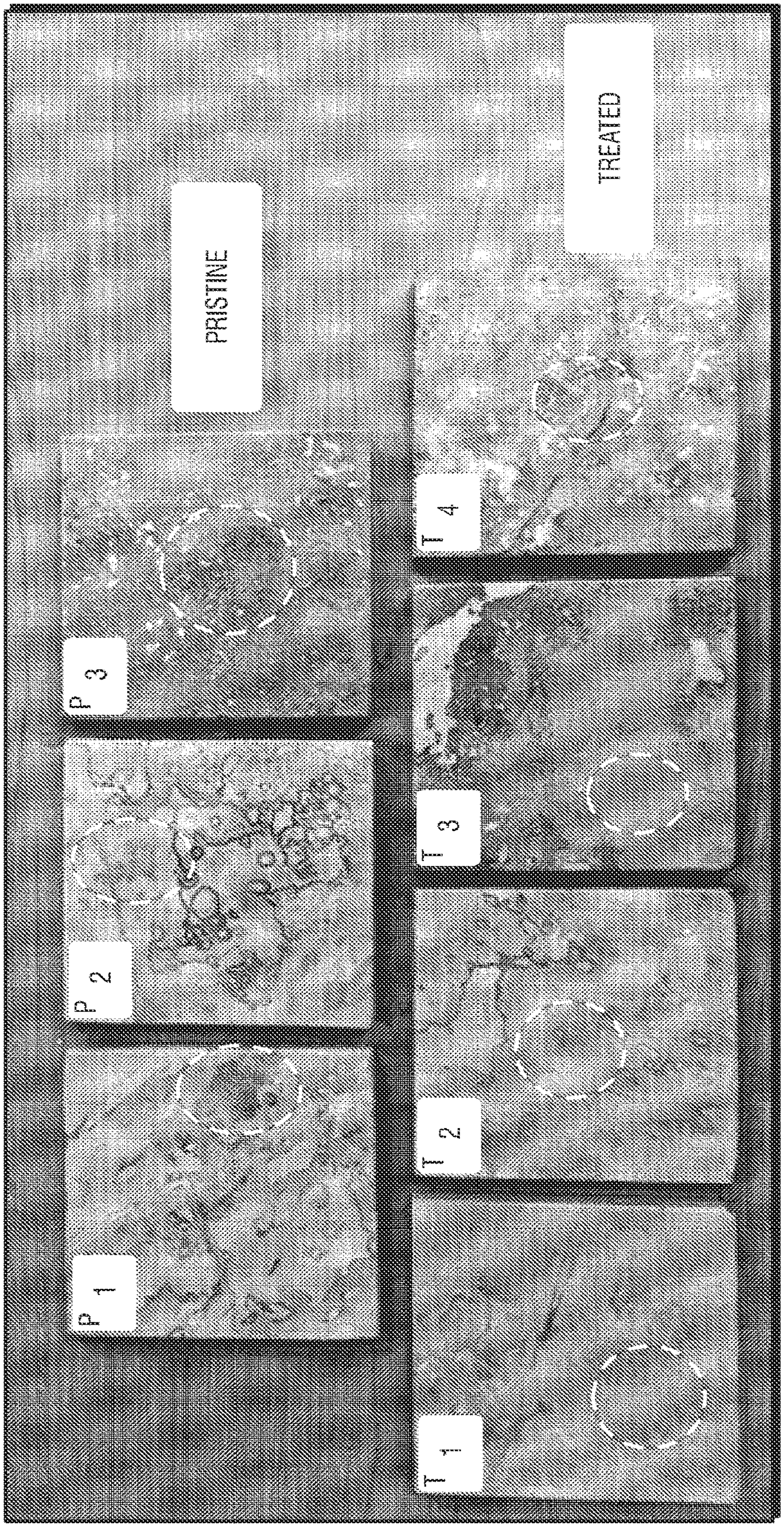
FIG. 5 shows images of travertine tile samples that were used to assess the efficacy of treated samples against staining via an acidic staining agent.

The following test method was conducted to evaluate the stain-resistant properties of the treated sample at the tile-air interface (AATCC Test Method 175-2013): The four treated sample 16 duplicates (labeled T1, T2, T3, and T4) were then compared against three untreated sample 15 duplicates (labeled P1, P2 and P3). The table shown below is a summary of the AATCC Red 40 Stain Scale grade assigned to each experimental sample (1.0=severely stained and 10=no staining). FIG. 5 shows an image of the travertine tile samples that were used to assess the efficacy of treated samples against staining via an acidic staining agent. Here the sites where the staining agent was applied to each sample are circled in red. From the image, it is evident that pristine (untreated) tile samples were severely stained as compared to treated samples, which exhibit essentially no staining.

| Sample # | AATCC Red 40 Stain Scale Grade |
|---|---|
| 15-P1 | 3.75 |
| 15-P2 | 4.50 |
| 15-P3 | 6.00 |
| 16-T1 | 9.75 |
| 16-T2 | 9.25 |
| 16-T3 | 10.0 |
| 16-T4 | 9.50 |

Embodiments described herein are included to demonstrate particular aspects of the present disclosure. It should be appreciated by those of skill in the art that the embodiments described herein merely represent exemplary embodiments of the disclosure. Those of ordinary skill in the art should, in light of the present disclosure, appreciate that many changes can be made in the specific embodiments described and still obtain a like or similar result without departing from the spirit and scope of the present disclosure. From the foregoing description, one of ordinary skill in the art can easily ascertain the essential characteristics of this disclosure, and without departing from the spirit and scope thereof, can make various changes and modifications to adapt the disclosure to various usages and conditions. The embodiments described hereinabove are meant to be illustrative only and should not be taken as limiting of the scope of the disclosure.

What is claimed is:

1. A composite solution comprising:

water;

an acid;

a water-free first solvent comprising methanol;

a base chemical reagent comprising tetraethyl orthosilicate;

a plasticizer comprising trimethoxypropylsilane; and a bonding agent comprising 3-glycidoxypropyltrimethoxysilane, wherein the composite solution comprises:

3-8 vol. % of water, 20-30 vol. % of the first solvent, 40-60 vol. % of the base chemical reagent, 10-15 vol. % of the plasticizer, and 1-5 vol. % of the bonding agent, based on 100 vol. % of the composite solution.

2. The composite solution of claim 1, wherein the composite solution is prepared by stirring at an elevated temperature in a range of 50-100° C.

3. The composite solution of claim 2, wherein the composite solution is stirred at the elevated temperature for ½ hour to 12 hours.

4. The composite solution of claim 1, wherein the composite solution is utilized to coat a substrate that is a porous material.

5. The composite solution of claim 4, wherein the porous material is selected from wood or masonry material.

6. The composite solution of claim 1, wherein the composite solution is prepared under acidic condition with a pH of equal to or less than 5.

7. The composite solution of claim 1, wherein a coating formed with the composite solution does not change the pigmentation and reflectivity of the substrate before coating.

8. The composite solution of claim 1, wherein the first solvent further comprises at least one of ethanol, n-propanol, isopropanol, n-butanol, isobutanol, ethylene glycol, glycerol acetone, acetonitrile, dioxane, tetrahydrofuran, dimethylformamide, dimethyl sulfoxide or a mixture thereof.

9. The composite solution of claim 1, wherein the composite solution further comprises a chelating agent, wherein the chelating agent is selected from an alkoxysilane, metal oxide precursor, or a combination thereof having a general formula of $M(OR)_xR'_yR''_z$ (M=Si, Al, In, Sn or Ti; x is the integer 1, 2 or 3; y is the integer 0, 1 or 2; z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R'' comprises a substituted or unsubstituted alky or alkenyl group comprising from 3 to 20 carbon atoms, or the chelating agent is selected from an alkoxysilane, metal oxide precursor, or a combination thereof having a general formula of $M(OR)_xR'_yR''_z$ (M=Si, Al, In, Sn or Ti; x is the integer 1, 2 or 3; y is the integer 0, 1 or 2;

z is the integer 1, 2 or 3, provided that the sum of x, y and z equals 4), where R comprises hydrogen, a substituted or unsubstituted alkyl or derivatives thereof; R' comprises hydrogen, a substituted or unsubstituted alkyl or derivatives thereof and R" comprises a substituted or unsubstituted amine (including primary, secondary and tertiary) or thiol.

10. The composite solution of claim 1, wherein the composite solution is for a substrate to improve soil-resistance, stain-resistance, weather-resistance, or fungal-resistance.

* * * * *